March 4, 1941. M. L. REIBOLD 2,233,851

FUEL CONTAINING PLATEN FOR REPAIR VULCANIZERS

Filed July 24, 1939

INVENTOR
MELVIN L. REIBOLD
BY
Wheeler, Wheeler & Wheeler
ATTORNEYS

Patented Mar. 4, 1941

2,233,851

UNITED STATES PATENT OFFICE 2,233,851

FUEL CONTAINING PLATEN FOR REPAIR VULCANIZERS

Melvin L. Reibold, Beaver Dam, Wis., assignor to The Shaler Company, Waupun, Wis., a corporation of Delaware Application July 24, 1939, Serial No. 286,057

4 Claims. (Cl. 18—18)

This invention relates to improvements in fuel-containing platens for repair vulcanizers, this application being divisional to a co-pending application bearing even date herewith, describing and claiming improvements in repair vulcanizer.

In the art of repair vulcanization it has been customary to employ a pan-shaped platen containing a fuel disk or wafer closely fitted to the raised walls of the platen. The theory was that contact of the fuel with the raised wall of the platen would promote uniformity by excluding air and preventing the fuel wafer from warping or lifting during combustion, and would also heat the margins of the pan sufficiently to prevent material lateral heat transfer from the portions of the bottom of the pan which are in contact with the patch. Combustion of the fuel disk or wafer is relied upon to supply a predetermined number of heat units to the patch, during a period of time also predetermined by the composition and thickness of the fuel wafer.

Warping or lifting of the fuel wafer during combustion has presented a major problem, which has heretofore never been satisfactorily solved. When the fuel wafer warps or lifts bodily from the bottom of the pan, it may burst into flame, and, in any case, heat is dissipated into the atmosphere which should be transmitted directly through the bottom of the pan to the patch. In such cases incomplete vulcanization results. Irregularity of combustion presents a major problem. Once all fuel wafers are made to burn substantially alike, the fuel content can readily be adjusted.

Various means have been devised with a view of solving the problem above stated. The fuel disk has ordinarily been made of a size to fit the pan, and attempts have frequently been made to devise clamping means for not only holding the pan in pressure relation to the patch, but for also holding the fuel disk to the bottom of the pan. But the holding devices rapidly absorb the heat from the fuel wafer at the points of contact therewith, and gases frequently are generated underneath the wafer during combustion, which lift it bodily or cause it to warp if holding devices are employed.

The object of this invention is to promote uniform heat delivery by spacing the side of the fuel wafer from the pan throughout most of its periphery to give uniform access of air to the wafer, insulate the wafer against direct heat transfer to the pan wall, permit ready escape of gases without lifting the wafer and still hold its marginal portions against lifting or warping tendencies by means which will not absorb a material degree of heat or interfere in any way with a proper transfer of heat units to the patch.

In the drawing.

Like parts are identified by the same reference characters throughout the several views.

Figure 1:
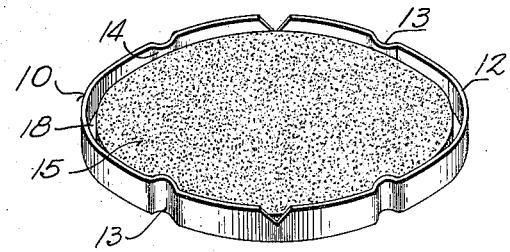
Fig. 1 is a perspective view of an oval heat unit patch assembly showing my invention incorporated therein.
Figure 2:
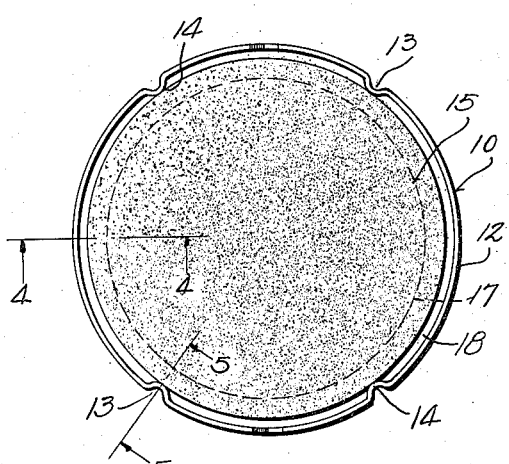
Fig. 2 is a top plan view of the unit as shown in Fig. 1.
Figure 3:
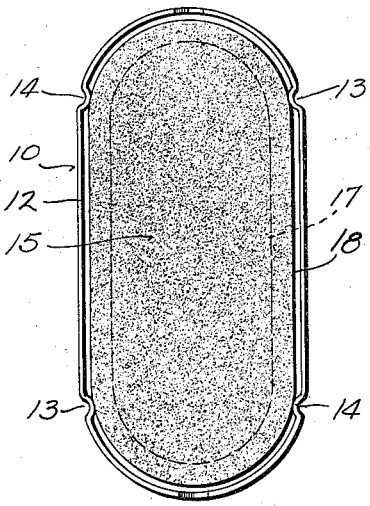
Fig. 3 is a top plan view of an oblong type patch unit with my inventive principles so incorporated therein.

As viewed in Figs. 1, 2 and 3, an otherwise conventional patch platen 10 which includes a flat base member 11 and upwardly projecting integral flange 12 has said flange provided with marginal indentations 13 to provide inwardly projecting and vertically extending ribs 14 to provide means for securely positioning the fuel unit wafer 15 in marginally spaced relation to the inner periphery of flanged wall 12 except at the points of contact between ribs 14 and the fuel wafer. While I prefer to provide such patch platen with four such inwardly projecting ribs, it is seen that the exact number provided is immaterial so long as they sufficiently position the fuel wafer in proper marginal relation to the vertical platen flange. To obtain the best results these ribs should be symmetrically disposed.

Fuel wafer 15 is of such size that its margin will engage the ribs 14, the wafer being inserted under pressure and its margins being somewhat indented in the zones of contact with the ribs with which they are in pressed fit relationship.

It is thus seen that arcuate channels 18 are provided between each successive indented rib to provide an unrestricted outlet for heat as well as an outlet for gases which are generated between the heat wafer and base 11 of the patch platen.

The marginal portions of the fuel wafer between the ribs are preferably out of contact with flange 12 of the pan, whereby air may enter to support uniform combustion and gases may escape without lifting the fuel. The increased access of oxygen to the wafer will tend to compensate for a proportionate loss in heat units if it is necessary to decrease the area of the wafer in proportion to the pan. Otherwise, the wafer may be left the same size and the pan made larger or more heat units per unit of area may be built into the heat wafer by a change in the formula of the fuel material or by increasing the thickness of the wafer if it is desirable to employ the same formula.

Figure 4:
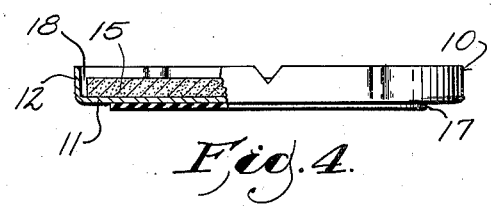
Fig. 4 is a side elevation of the oval patch unit shown in Fig. 2, partly broken away to disclose a section as taken along line 4—4 of Fig. 2.
Figure 5:
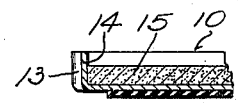
Fig. 5 is a section taken along line 5—5 of Fig. 2.

The walls of the pan are of thin metal and heat conduction to the margins from its bottom portions is negligible. The fuel wafer is preferably larger than the patch 17, Figs. 4 and 5, and therefore the loss of heat at the margins of the pan has substantially no effect in reducing the number of heat units transmitted to the patch. The major factors in predetermining the number of heat units to be transmitted to the patch are uniformity of contact between the fuel and the bottom of the pan in the area directly above the patch and uniformity in rate of combustion.

It will be observed that the bottom of the platen has a considerably greater area than that of the vulcanizable material 17 which constitutes the patch, and the fuel wafer 15 has an intermediate area and is centered by the ribs 13 and 14 with reference to the patch, the marginal portions of the fuel wafer between the ribs being spaced from the upwardly extending walls of the platen. The margins of the wafer are in pressed fit relation to the ribs, and the ribs are sufficiently numerous to frictionally retain the wafer in a flat position on the bottom of the pan during combustion under all ordinary circumstances. Combustion tends to proceed most rapidly along the exposed margins of the wafer, and any gases tending to develop underneath the wafer are consumed along these margins as fast as they develop. The excess heat thus developed is dissipated radially as well as upwardly, and the portion of the fuel wafer which lies directly above the patch material is unaffected by external conditions, and therefore capable of delivering with extreme accuracy the desired predetermined number of heat units directly through the thin bottom of the platen into the patch. There is no heat conduction into any overlying pressure applying metal surfaces.

I claim:
1. The combination with a thin metallic pan-shaped repair vulcanizer platen having adherent to its bottom a layer of vulcanizable patch material of less diameter than the platen, of a fuel wafer of intermediate diameter mounted within the platen, and upwardly extending ribs carried by the platen in centering engagement with the fuel wafer, the margins of the wafer being otherwise spaced from the peripheral wall of the platen.

2. A thin metal pan-shaped repair vulcanizer platen having raised side walls inwardly embossed at intervals to provide upwardly extending ribs adapted for centering a fuel disk of less diameter on the upper surface of the bottom of the platen, with the margins of the fuel disk in frictional pressure contact with the ribs, and otherwise spaced from the side walls of the platen.

3. The combination with a thin metal pan-shaped repair vulcanizer platen having a layer of patch material of less diameter centrally secured to the bottom surface of the platen, of a fuel wafer of large diameter than the layer of patch material and of less diameter than that of the platen, and means carried by the side wall of the platen for centering the fuel disk with its margins extending on all sides beyond the area occupied by the patch material, said centering means extending upwardly at the points of engagement with the fuel wafer in frictional pressure contact therewith and adapted to hold the wafer to the upper surface of the bottom of the platen, with all other marginal portions of the wafer spaced from the side wall of the platen.

4. A thin metal pan-shaped repair vulcanizer platen having its side walls provided at intervals with concavo-convex indented portions forming upwardly extending interior ribs, in combination with a fuel wafer disposed within the platen with its margins in pressed fit relation to the indented portions, whereby the indented portions are adapted to hold the wafer centered in a flat position on the bottom of the platen, while allowing the free escape of gases from underneath all other portions of the margins of the wafer.

MELVIN L. REIBOLD.